United States Patent [19]
Walley

[11] Patent Number: 5,732,111
[45] Date of Patent: Mar. 24, 1998

[54] FREQUENCY ERROR COMPENSATION FOR DIRECT SEQUENCE SPREAD SPECTRUM SYSTEMS

[75] Inventor: John S. Walley, Lake Forest, Calif.

[73] Assignee: Rockwell International Corporation, Newport Beach, Calif.

[21] Appl. No.: 568,095

[22] Filed: Dec. 6, 1995

[51] Int. Cl.$^6$ .................................................. H04L 27/06
[52] U.S. Cl. ...................... 375/344; 375/206; 455/197.2
[58] Field of Search ................................. 375/200, 206, 375/316, 340, 344; 455/192.1, 192.2

[56] References Cited

U.S. PATENT DOCUMENTS

| | | | |
|---|---|---|---|
| 4,481,640 | 11/1984 | Chow et al. | 375/1 |
| 4,724,435 | 2/1988 | Moses et al. | 340/870 |
| 4,804,938 | 2/1989 | Rouse et al. | 340/310 |
| 5,042,050 | 8/1991 | Owen | 375/1 |
| 5,077,753 | 12/1991 | Grau, Jr. et al. | 375/1 |
| 5,103,459 | 4/1992 | Gilhousen et al. | 375/1 |
| 5,150,377 | 9/1992 | Vannucci | 375/1 |
| 5,280,472 | 1/1994 | Gilhousen | 370/18 |
| 5,309,474 | 5/1994 | Gilhousen et al. | 375/1 |
| 5,351,270 | 9/1994 | Graham et al. | 375/1 |
| 5,375,140 | 12/1994 | Bustamante et al. | 375/1 |
| 5,416,797 | 5/1995 | Gilhousen et al. | 375/705 |

*Primary Examiner*—Stephen Chin
*Assistant Examiner*—Bryan Webster
*Attorney, Agent, or Firm*—James P. O'Shaughnessy; William C. Cray

[57] ABSTRACT

A frequency error calibration, estimation and compensation device and method for direct sequence spread spectrum systems, such as digital cordless telephones having a handset and a base station. Initial frequency calibration occurs when the handset is physically coupled to the base station. The allowable frequency error range is divided into a plurality of frequency bins. Both the handset and base station transmit and receive messages using a predetermined frequency offset bin as an estimate of the frequency error. A signal quality value is determined and then a next bin is selected and a next signal quality value is determined. Once a signal quality value has been determined for each frequency bin, a communications link is established between the handset and the base station to allow automatic frequency control tracking to fine tune the frequency offset value. If the signal quality is not above a threshold value, the procedure is repeated. After system calibration, frequency error estimation is performed by cross product demodulation of the received in-phase and quadrature signals. The cross product output is limited and filtered. A phase rotator performs frequency compensation by multiplying the received in-phase and quadrature signals by $(\cos\phi(t)+j\sin\phi(t))$ where $\phi(t)$ is the sum of the current phase value and the limited and filtered cross product value.

10 Claims, 14 Drawing Sheets

| |I1| | |I0| | |Q1| | |Q0| | Angle | A3 | A2 | A1 | A0 | Mag.$^2$ | M2 | M1 | M0 |
|---|---|---|---|---|---|---|---|---|---|---|---|---|
| 0 | 0 | 0 | 0 | 45 | 1 | 0 | 0 | 0 | 2=>10 | 0 | 0 | 0 |
| 0 | 1 | 0 | 0 | 16.875 | 0 | 0 | 1 | 1 | 10 | 0 | 0 | 0 |
| 1 | 0 | 0 | 0 | 11.25 | 0 | 0 | 1 | 0 | 26 | 0 | 1 | 0 |
| 1 | 1 | 0 | 0 | 5.625 | 0 | 0 | 0 | 1 | 50 | 1 | 0 | 0 |
| 0 | 0 | 0 | 1 | 73.125 | 1 | 1 | 0 | 1 | 10 | 0 | 0 | 0 |
| 0 | 1 | 0 | 1 | 45 | 1 | 0 | 0 | 0 | 18 | 0 | 0 | 1 |
| 1 | 0 | 0 | 1 | 33.75 | 0 | 1 | 1 | 0 | 34 | 0 | 1 | 1 |
| 1 | 1 | 0 | 1 | 22.5 | 0 | 1 | 0 | 0 | 58 | 1 | 0 | 1 |
| 0 | 0 | 1 | 0 | 78.75 | 1 | 1 | 1 | 0 | 26 | 0 | 1 | 0 |
| 0 | 1 | 1 | 0 | 56.25 | 1 | 0 | 1 | 0 | 34 | 0 | 1 | 1 |
| 1 | 0 | 1 | 0 | 45 | 1 | 0 | 0 | 0 | 50 | 1 | 0 | 0 |
| 1 | 1 | 1 | 0 | 33.75 | 0 | 1 | 1 | 0 | 74 | 1 | 1 | 0 |
| 0 | 0 | 1 | 1 | 84.375 | 1 | 1 | 1 | 1 | 50 | 1 | 0 | 0 |
| 0 | 1 | 1 | 1 | 67.5 | 1 | 1 | 0 | 0 | 58 | 1 | 0 | 1 |
| 1 | 0 | 1 | 1 | 56.25 | 1 | 0 | 1 | 0 | 74 | 1 | 1 | 0 |
| 1 | 1 | 1 | 1 | 45 | 1 | 0 | 0 | 0 | 98 | 1 | 1 | 1 |

| I2 | Q2 | Quadrant | A5 | A4 |
|---|---|---|---|---|
| 0 | 0 | 0 - 90 | 0 | 0 |
| 1 | 0 | 90 - 180 | 0 | 1 |
| 1 | 1 | 180 - 270 | 1 | 0 |
| 0 | 1 | 270 - 360 | 1 | 1 |

FIG. 5

| A5 | A4 | Quadrant | I2 | Q2 |
|----|----|----------|----|----|
| 0 | 0 | 0 - 90 | 0 | 0 |
| 0 | 1 | 90 - 180 | 1 | 0 |
| 1 | 0 | 180 - 270 | 1 | 1 |
| 1 | 1 | 270 - 360 | 0 | 1 |

| | | | | | | M2 = 0 | | | | M2 = 1 | | | |
|---|---|---|---|---|---|---|---|---|---|---|---|---|---|
| M1 | M0 | A3 | A2 | A1 | A0 | \|I1\| | \|I0\| | \|Q1\| | \|Q0\| | \|I1\| | \|I0\| | \|Q1\| | \|Q0\| |
| 0 | 0 | 0 | 0 | 0 | 0 | 0 | 1 | 0 | 0 | 1 | 1 | 0 | 0 |
|   |   | 0 | 0 | 0 | 1 | 0 | 1 | 0 | 0 | 1 | 1 | 0 | 0 |
|   |   | 0 | 0 | 1 | 0 | 0 | 1 | 0 | 0 | 1 | 1 | 0 | 0 |
|   |   | 0 | 0 | 1 | 1 | 0 | 1 | 0 | 0 | 1 | 1 | 0 | 1 |
|   |   | 0 | 1 | 0 | 0 | 0 | 1 | 0 | 0 | 1 | 1 | 0 | 1 |
|   |   | 0 | 1 | 0 | 1 | 0 | 1 | 0 | 0 | 1 | 1 | 0 | 1 |
|   |   | 0 | 1 | 1 | 0 | 0 | 1 | 0 | 0 | 1 | 0 | 1 | 0 |
|   |   | 0 | 1 | 1 | 1 | 0 | 1 | 0 | 1 | 1 | 0 | 1 | 0 |
|   |   | 1 | 0 | 0 | 0 | 0 | 1 | 0 | 1 | 1 | 0 | 1 | 0 |
|   |   | 1 | 0 | 0 | 1 | 0 | 0 | 0 | 1 | 1 | 0 | 1 | 0 |
|   |   | 1 | 0 | 1 | 0 | 0 | 0 | 0 | 1 | 0 | 1 | 1 | 1 |
|   |   | 1 | 0 | 1 | 1 | 0 | 0 | 0 | 1 | 0 | 1 | 1 | 1 |
|   |   | 1 | 1 | 0 | 0 | 0 | 0 | 0 | 1 | 0 | 1 | 1 | 1 |
|   |   | 1 | 1 | 0 | 1 | 0 | 0 | 0 | 1 | 0 | 0 | 1 | 1 |
|   |   | 1 | 1 | 1 | 0 | 0 | 0 | 0 | 1 | 0 | 0 | 1 | 1 |
|   |   | 1 | 1 | 1 | 1 | 0 | 0 | 0 | 1 | 0 | 0 | 1 | 1 |
| 0 | 1 | 0 | 0 | 0 | 0 | 1 | 0 | 0 | 0 | 1 | 1 | 0 | 0 |
|   |   | 0 | 0 | 0 | 1 | 1 | 0 | 0 | 0 | 1 | 1 | 0 | 0 |
|   |   | 0 | 0 | 1 | 0 | 1 | 0 | 0 | 0 | 1 | 1 | 0 | 0 |
|   |   | 0 | 0 | 1 | 1 | 1 | 0 | 0 | 0 | 1 | 1 | 0 | 1 |
|   |   | 0 | 1 | 0 | 0 | 1 | 0 | 0 | 0 | 1 | 1 | 0 | 1 |
|   |   | 0 | 1 | 0 | 1 | 1 | 0 | 0 | 1 | 1 | 1 | 0 | 1 |
|   |   | 0 | 1 | 1 | 0 | 1 | 0 | 0 | 1 | 1 | 1 | 1 | 0 |
|   |   | 0 | 1 | 1 | 1 | 1 | 0 | 0 | 1 | 1 | 0 | 1 | 0 |
|   |   | 1 | 0 | 0 | 0 | 1 | 0 | 0 | 1 | 1 | 0 | 1 | 0 |
|   |   | 1 | 0 | 0 | 1 | 1 | 0 | 0 | 1 | 1 | 0 | 1 | 1 |
|   |   | 1 | 0 | 1 | 0 | 1 | 0 | 0 | 1 | 0 | 1 | 1 | 1 |
|   |   | 1 | 0 | 1 | 1 | 0 | 0 | 0 | 1 | 0 | 1 | 1 | 1 |
|   |   | 1 | 1 | 0 | 0 | 0 | 0 | 0 | 1 | 0 | 1 | 1 | 1 |
|   |   | 1 | 1 | 0 | 1 | 0 | 0 | 1 | 0 | 0 | 0 | 1 | 1 |
|   |   | 1 | 1 | 1 | 0 | 0 | 0 | 1 | 0 | 0 | 0 | 1 | 1 |

FIG. 6 (Part 1)

| | | | | | | M2 = 0 | | | | M2 = 1 | | | |
|---|---|---|---|---|---|---|---|---|---|---|---|---|---|
| M1 | M0 | A3 | A2 | A1 | A0 | \|I1\| | \|I0\| | \|Q1\| | \|Q0\| | \|I1\| | \|I0\| | \|Q1\| | \|Q0\| |
| 1 | 0 | 0 | 0 | 0 | 0 | 1 | 0 | 0 | 0 | 1 | 1 | 0 | 0 |
| | | 0 | 0 | 0 | 1 | 1 | 0 | 0 | 0 | 1 | 1 | 0 | 0 |
| | | 0 | 0 | 1 | 0 | 1 | 0 | 0 | 0 | 1 | 1 | 0 | 1 |
| | | 0 | 0 | 1 | 1 | 1 | 0 | 0 | 0 | 1 | 1 | 0 | 1 |
| | | 0 | 1 | 0 | 0 | 1 | 0 | 0 | 1 | 1 | 1 | 0 | 1 |
| | | 0 | 1 | 0 | 1 | 1 | 0 | 0 | 1 | 1 | 1 | 1 | 0 |
| | | 0 | 1 | 1 | 0 | 1 | 0 | 0 | 1 | 1 | 1 | 1 | 0 |
| | | 0 | 1 | 1 | 1 | 0 | 1 | 0 | 1 | 1 | 1 | 1 | 0 |
| | | 1 | 0 | 0 | 0 | 0 | 1 | 0 | 1 | 1 | 0 | 1 | 1 |
| | | 1 | 0 | 0 | 1 | 0 | 1 | 1 | 0 | 1 | 0 | 1 | 1 |
| | | 1 | 0 | 1 | 0 | 0 | 1 | 1 | 0 | 1 | 0 | 1 | 1 |
| | | 1 | 0 | 1 | 1 | 0 | 1 | 1 | 0 | 0 | 1 | 1 | 1 |
| | | 1 | 1 | 0 | 0 | 0 | 1 | 0 | 0 | 0 | 1 | 1 | 1 |
| | | 1 | 1 | 0 | 1 | 0 | 1 | 0 | 0 | 0 | 1 | 1 | 1 |
| | | 1 | 1 | 1 | 0 | 0 | 1 | 0 | 0 | 0 | 0 | 1 | 1 |
| | | 1 | 1 | 1 | 1 | 0 | 1 | 0 | 0 | 0 | 0 | 1 | 1 |
| 1 | 1 | 0 | 0 | 0 | 0 | 1 | 0 | 0 | 0 | 1 | 1 | 0 | 0 |
| | | 0 | 0 | 0 | 1 | 1 | 0 | 0 | 0 | 1 | 1 | 0 | 0 |
| | | 0 | 0 | 1 | 0 | 1 | 0 | 0 | 0 | 1 | 1 | 0 | 1 |
| | | 0 | 0 | 1 | 1 | 1 | 0 | 0 | 0 | 1 | 1 | 0 | 1 |
| | | 0 | 1 | 0 | 0 | 1 | 0 | 0 | 1 | 1 | 1 | 1 | 0 |
| | | 0 | 1 | 0 | 1 | 1 | 0 | 0 | 1 | 1 | 1 | 1 | 0 |
| | | 0 | 1 | 1 | 0 | 1 | 0 | 0 | 1 | 1 | 1 | 1 | 0 |
| | | 0 | 1 | 1 | 1 | 1 | 0 | 0 | 1 | 1 | 1 | 1 | 1 |
| | | 1 | 0 | 0 | 0 | 0 | 1 | 1 | 0 | 1 | 1 | 1 | 1 |
| | | 1 | 0 | 0 | 1 | 0 | 1 | 1 | 0 | 1 | 0 | 1 | 1 |
| | | 1 | 0 | 1 | 0 | 0 | 1 | 1 | 0 | 1 | 0 | 1 | 1 |
| | | 1 | 0 | 1 | 1 | 0 | 1 | 1 | 0 | 1 | 0 | 1 | 1 |
| | | 1 | 1 | 0 | 0 | 0 | 1 | 0 | 0 | 0 | 1 | 1 | 1 |
| | | 1 | 1 | 0 | 1 | 0 | 1 | 0 | 0 | 0 | 1 | 1 | 1 |
| | | 1 | 1 | 1 | 0 | 0 | 1 | 0 | 0 | 0 | 0 | 1 | 1 |
| | | 1 | 1 | 1 | 1 | 0 | 1 | 0 | 0 | 0 | 0 | 1 | 1 |

FIG. 6 (Part 2)

| LIMITER INPUT | LIMITER OUTPUT |
|---|---|
| X>0 | 1 |
| X<0 | −1 |
| X=0 | 0 |

*FIG. 14*

FREQUENCY ERROR COMPENSATION FOR DIRECT SEQUENCE SPREAD SPECTRUM SYSTEMS

BACKGROUND OF THE INVENTION

1. Field of the Invention

The present invention relates generally to improvements in digital spread spectrum systems and, more particularly, pertains to a new and improved device and method for frequency calibration, estimation and compensation for digital cordless direct sequence spread spectrum telephones.

2. Description of Related Art

Cordless telephones currently exist which provide good speech quality using analog frequency modulation in the 46/49 MHz band. These analog cordless phones are inexpensive and have become a common replacement for the traditional corded phones. However, analog cordless phones have a limited useful range, requiring the handset to be operated in close proximity to the base station. Also, analog cordless phones are susceptible to interference and lack adequate security for protecting the privacy of conversations.

One solution to improve cordless telephone performance is to use digital modulation and coding techniques. Digital modulation and coding offer more robust voice communication over a radio channel than analog modulation. Digital modulation also provides a more noise-free conversation by suppressing co-channel and adjacent channel interference. Additionally, with digital modulation and coding, effective scrambling codes can be added to improve phone security.

Another solution is to use the 902–928 MHz Industrial, Medical and Scientific (ISM) band for radio transmission and reception. The Federal Communications Commission (FCC) allows transmitters in this band to have increased power levels, as compared to the 46/49 MHz band, which increases the useful operating range. At the highest transmit power levels, which are needed for digital phones to overcome interference, the FCC requires that the phone systems implement spread spectrum modulation.

In Direct Sequence Spread Spectrum (DSSS) systems, such as digital cordless telephones operating in the ISM band, it is desirable to use very inexpensive crystal oscillator references in both the handset and base station in order to reduce overall system cost. However, the cheaper the crystals, the greater the inaccuracy in the oscillator frequency.

SUMMARY OF THE INVENTION

Thus, it is an object of the present invention to provide an improved frequency error estimation, calibration and removal method and device which would allow the use of inexpensive and inaccurate crystal references on the order of ±100 ppm.

Initial frequency calibration between the handset and the base occurs when the handset is parked in the base station cradle. Both the handset and the base station transmit and receive using a frequency offset bin as an estimate of the frequency error. The allowable frequency range is divided into several bins and a signal quality value is calculated based on the dot product detector and signal quality hardware for each bin. The Numerically Controlled Oscillator (NCO) on each side is then set to the frequency bin which resulted in the maximum signal quality. A communication link is then established between the base and handset to allow Automatic Frequency Control (AFC) tracking to adjust the NCO. The signal quality is tested again and if it is not above a predetermined threshold, the procedure is repeated.

The frequency error estimation during AFC is performed by cross product demodulation of the I and Q signals, with the output of the cross product detector limited to one bit. The cross product output is then filtered by a random walk digital filter which smoothes amplitude errors in the frequency estimation. Frequency compensation is performed by a complex phase rotator and a Numerically Controlled Oscillator (NCO). The phase rotator performs complex rotations on the I and Q signals to offset the actual frequency error. When the digital filter threshold is detected, the AFC compensation increases or decreases the frequency error by adjusting the value of the phase rotator's NCO, which adjusts the phase of the incoming signal.

BRIEF DESCRIPTION OF THE DRAWINGS

The exact nature of this invention, as well as the objects and advantages, will become readily apparent from consideration of the following specification as illustrated in the accompanying drawings, in which like reference numerals designate like parts throughout the figures thereof, and wherein:

FIG. 5 is a table showing the conversion mapping for converting I and Q signals from rectangular to polar form;

FIG. 6 is a table showing the conversion mapping for converting Magnitude and Phase signals from polar to rectangular form;

FIG. 14 shows the limited output values for the Cross Product used in the AFC circuits.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a device and method for frequency error estimation, calibration and removal for digital cordless telephones using Direct Sequence Spread Spectrum (DSSS).

Figure 1:
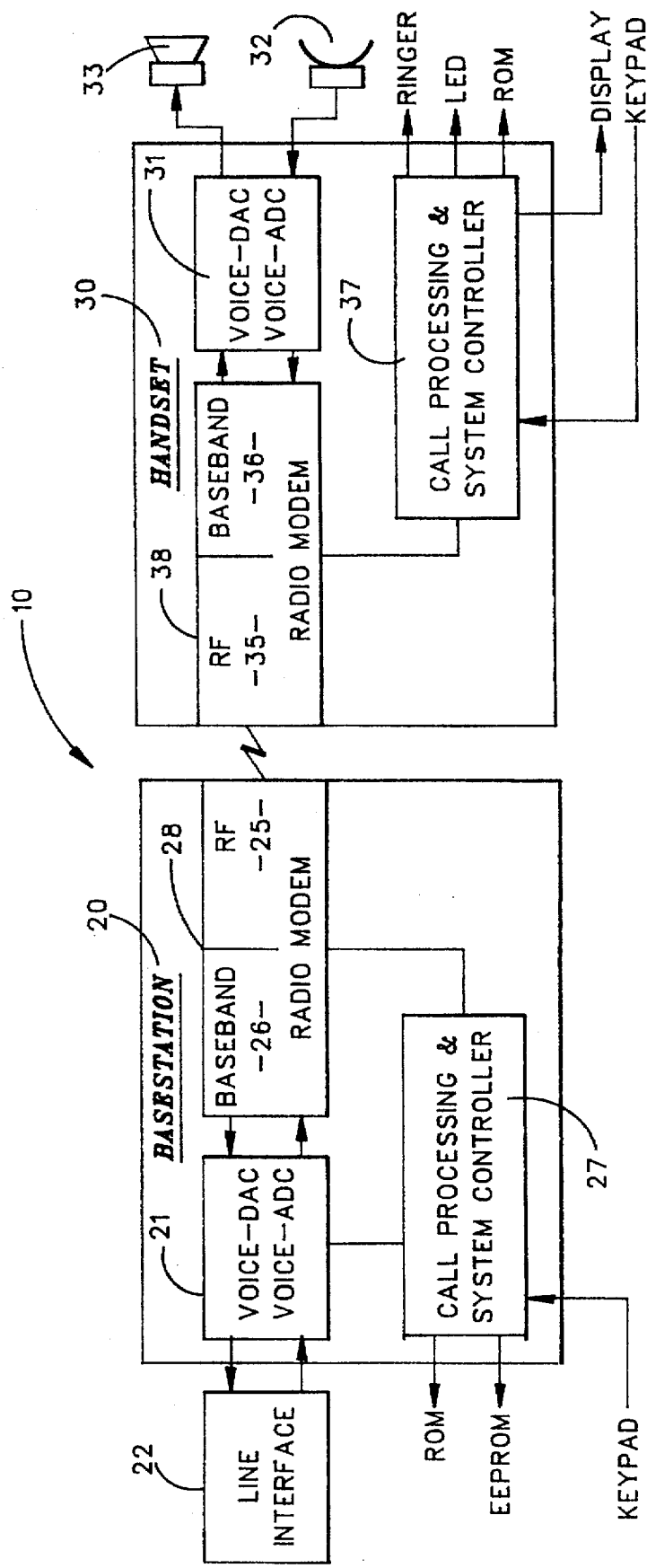
FIG. 1 is a system-level diagram of a base station and a handset that collectively form a digital cordless telephone of the present invention.

As shown in FIG. 1, a digital cordless telephone (DCT) 10 according to the present invention comprises a base station 20 and at least one handset 30. The DCT 10 is designed to provide full duplex voice communication between the handset 30 and the public switched telephone network (PSTN) (not shown) by way of an RF link through the base station 20.

The base station 20 and the handset 30 both include a Radio Modem 28, 38, respectively, which are composed of a Radio Frequency (RF) Modem 25, 35 and a Baseband Modem 26, 36, respectively. The RF Modems 25, 35 transmit digital voice and control data between the base station 20 and the handset 30. The base station 20 and handset 30 also have Audio Modems 21, 31 that respectively provide voice transport between the base station 20 and the PSTN and between the handset 30 and a microphone 32 and a speaker 33. Finally, the base station 20 and the handset 30 both have a system controller 27, 37, respectively, for call processing and control functions. The controllers 27, 37 function to provide the protocol for the Radio Modems 28, 38 to allow link establishment, maintenance, and power management.

The preferred RF Modem 35 is a direct conversion transceiver. For transmit, analog wave-shaped baseband data (TXD) is modulated directly to the carrier frequency. For receive, the carrier is directly converted to analog baseband in-phase (RXI) and quadrature (RXQ) signals. The preferred DCT 10 uses frequency division multiple access (FDMA) channelization which, in the 26 MHz-wide ISM band, provides 21 frequency channels at 1.2 MHz channel spacing.

The preferred Baseband Modem 36 is a narrow-band direct sequence spread spectrum (DSSS) burst modem that supports FDMA channelization and time division duplexing (TDD). The preferred transmit and receive time slots are both 2 ms wide, providing a 4 ms Tx/Rx superframe. The preferred modulation for data is differentially encoded Binary Phase Shift Keying (BPSK), and for the spreading code is BPSK. The differential encoding of the data is done such that a change of polarity over a bit interval represents a "−1" and a continuity of polarity represents a "+1."

The DCT 10 preferably uses bipolar signalling where +1 volt signal represents a binary "1" and a −1 volt signal represents a binary "0". Each bit is preferably direct sequence spread spectrum modulated with a 12-chip spreading code. The preferred spreading code repeats on bit boundaries so that, it remains "as is" when multiplied by a binary "1" (+1 volt) and is inverted when multiplied by a binary "0" (−1 volt). The preferred bit rate is 80 kHz, whereby the chip rate for the preferred 12-chip spreading code is 960 kHz (12×80 kHz).

Figure 10:
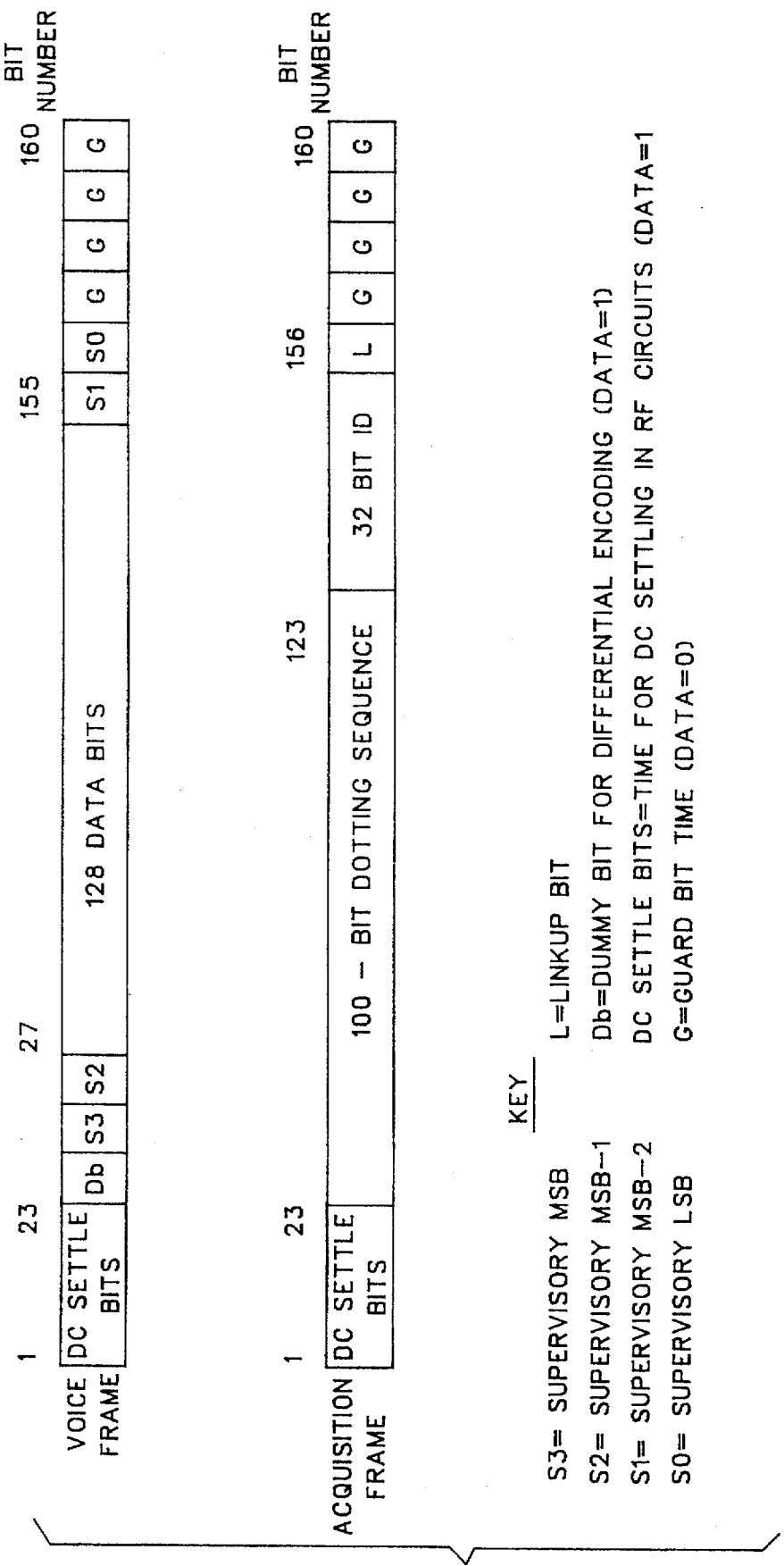
FIG. 10 shows the structures for two types of data flames used in a preferred embodiment, an acquisition frame (A-frame) and a voice frame (V-frame)

FIG. 10 shows the preferred 160-bit frame structures for a voice frame (V-frame) and an acquisition frame (A-frame). In the V-frame, the "Db" bit (24) is always "+1" to provide an initial phase reference for decoding the differentially encoded data during reception. In the A-frame, the first 23 bits (1–23) are all DC settle bits (all "1"s), which allow for DC settling of bias circuits in the RF Modem 35. The next 100 bits (24–123) are dotting bits (1,0, 1,0, . . . repeated), used by the Baseband Modem 36 for timing acquisition and tracking during an initial reception. The next 32 bits (124–155) are an ID word, followed by an "L-bit" (156) which is used to request an RF link response. Finally, there are 4 guard bits (157–160), which account for radio propagation and circuit delays.

Figure 2:
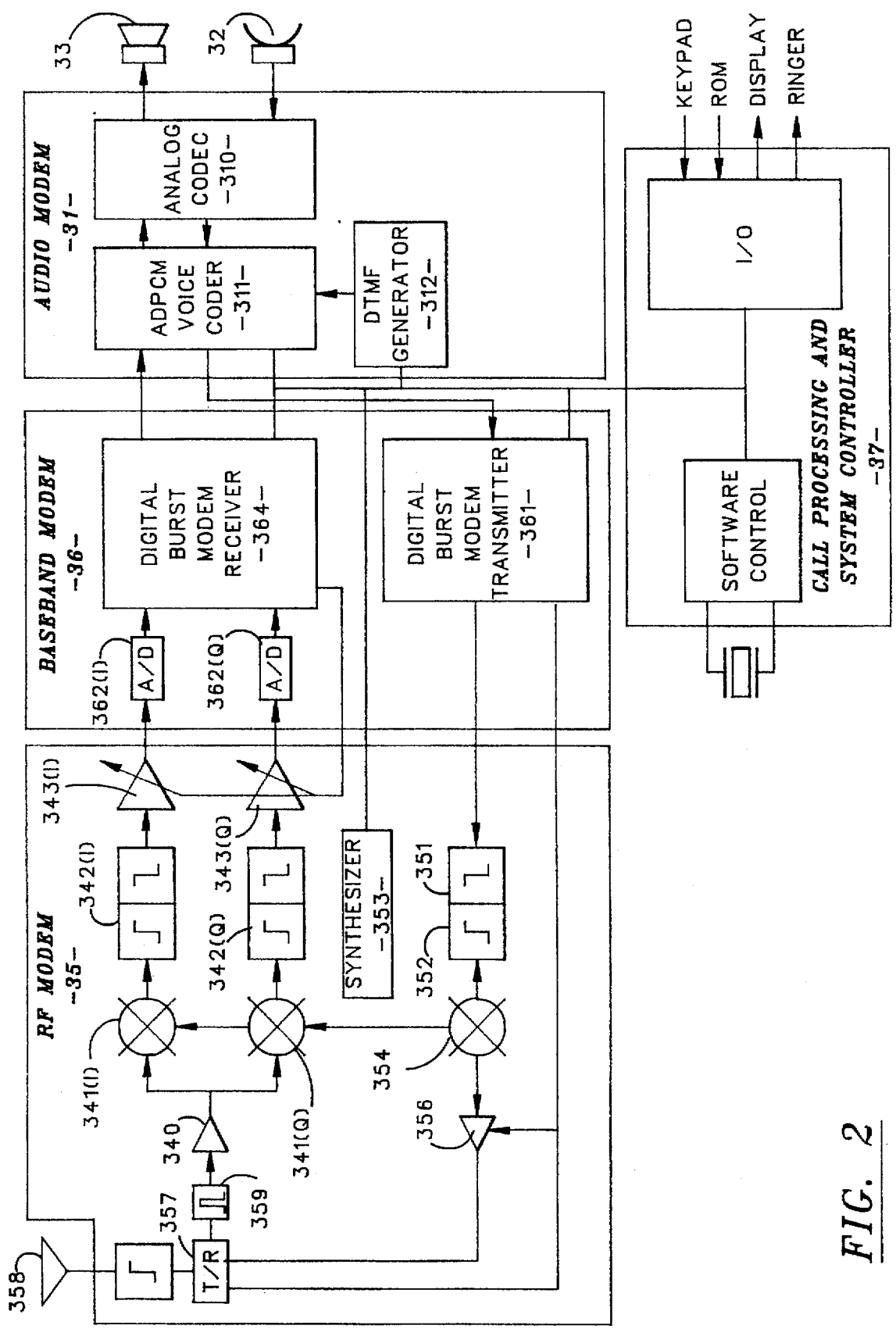
FIG. 2 is a functional block diagram of the RF Modem, Baseband Modem, Audio Modem, and Controller of the handset, the functional blocks of the base station being identical.

Referring to FIG. 2 in more detail, the preferred RF Modem 35 is shown to have a lower transmit path and an upper receive path. A common frequency synthesizer 353 provides the local oscillator frequency needed for modulation and demodulation. For transmission, the RF Modem 35 receives digital spread spectrum data TXD from the Baseband Modem 36, and passes the data TXD through a pair of filters 351,352 to a modulator 354 where it directly modulates the RF carrier. The first filter 351 is preferably a 10 kHz high pass filter 351 for removing any DC contributed by bias networks and the second filter 352 is preferably a 650 kHz low-pass filter for spectral shaping. The modulated signal is then amplified using a variable output amplifier 356 and routed to a Transmit/Receive (T/R) switch 357 for transmission by an antenna 358. For reception, the T/R switch 357 selects the receive path from the antenna 358, filters the received signal through a band-pass filter 359 to reject out-of-band signals, and then amplifies the filtered signal with a low noise amplifier 340. The signal then enters a pair of mixers 341(I), 341(Q) that down-convert it to analog in-phase (RXI) and quadrature (RXQ) spread spectrum signals. The analog spread spectrum signals RXI, RXQ are then passed through a pair of high-pass/low-pass filter blocks 342(I), 342(Q), respectively, to provide FDMA channel selectivity. Finally, each spread spectrum signal RXI, RXQ is amplified with programmable gain amplifiers 343 (I), 343(Q) to bring the signal up to proper voltage levels.

With continued reference to FIG. 2, the Baseband Modem 36 is shown to have a transmitter block 361 and a pair of Analog-to-Digital Converters (ADCs) 362(I), 362(Q) that feed a receiver block 364. During transmission, the transmitter block 361 takes analog baseband data from the Audio Modem 31, digitizes it, differentially encodes it, combines it with a spreading code, and then provides the resulting digital spread spectrum data TXD to the RF Modem 35 where it directly modulates the carrier for transmission. During reception, the ADCs 362(I), 362(Q) convert the RF Modem's analog spread spectrum signals RXI, RXQ into digital spread spectrum data I, Q. The receiver block 364 receives the digital spread spectrum data I, Q. It then removes the spreading code to recover the digital baseband data, decodes the differentially encoded data, and provides the resulting digital baseband data to the Audio Modem 31 for acoustic reproduction on the speaker 33.

Figure 3:
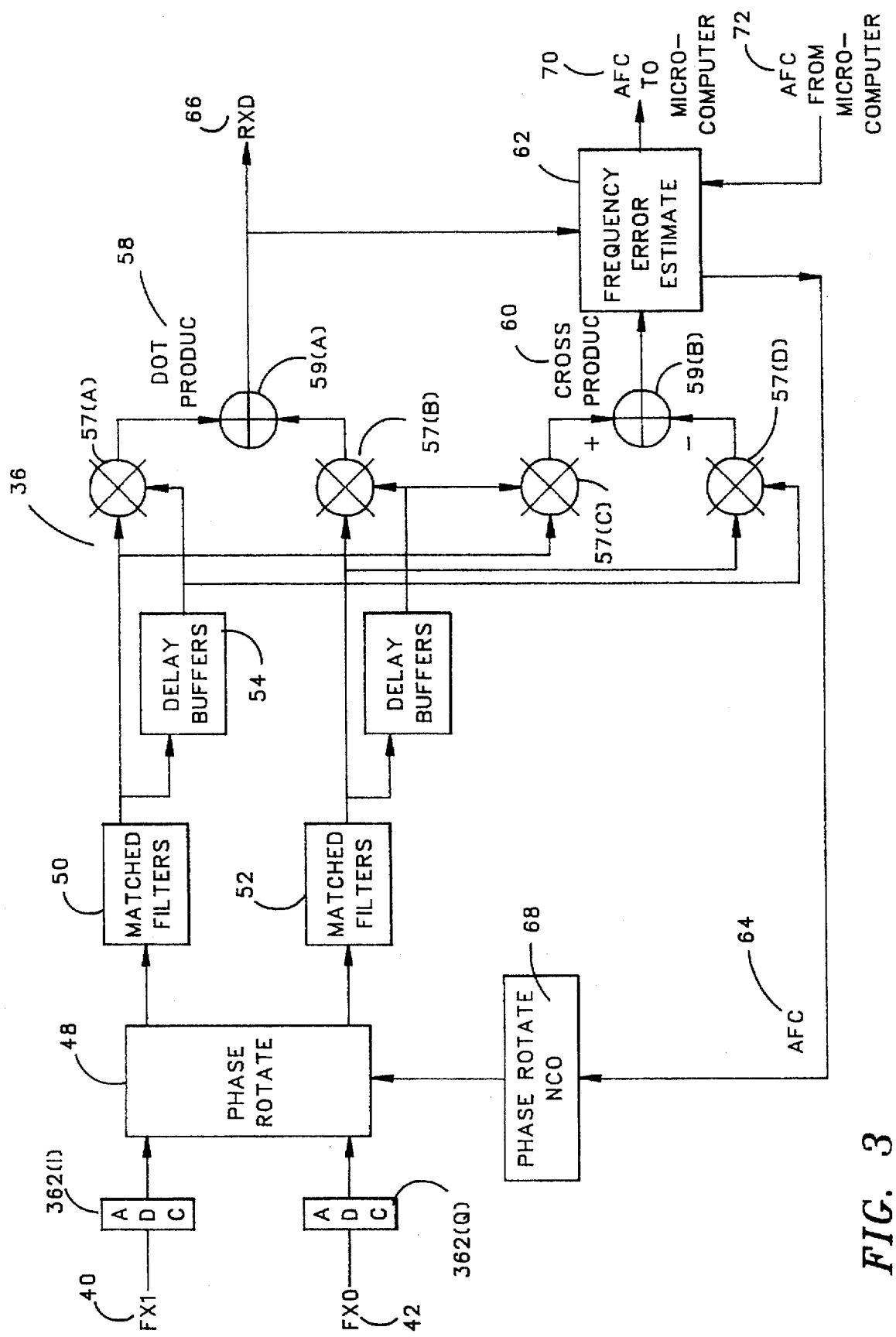
FIG. 3 is a block diagram of part of the Baseband Modem showing more detail than FIG. 2.

FIG. 3 shows the major functional blocks of the Baseband Modem 36 in further detail. As shown, the in-phase and quadrature analog signals RXI 40, RXQ 42 are provided to the ADCs 362(I), 362(Q) for conversion to corresponding digital signals I, Q. The preferred ADCs 362(I), 362(Q) sample the analog baseband signals RXI 40, RXQ 42 at 1.92 MHz (2 times the chip rate) and convert such analog signals into a series of 4-bit, 2's complement, digital signals I, Q. The ADCs preferably implement the following quantization values to reduce the data-movement requirements (ensuring the least significant bit (LSB) is always "1" so it may be implied) and to simplify later multiplication of the digital spread spectrum signals I, Q by ±1 (requiring only a simple inversion of the most significant three bits):

1001 (−7)
1011 (−5)
1101 (−3)

1111 (−1)
0001 (+1)
0011 (+3)
0101 (+5)
0111 (+7)

Figure 4:
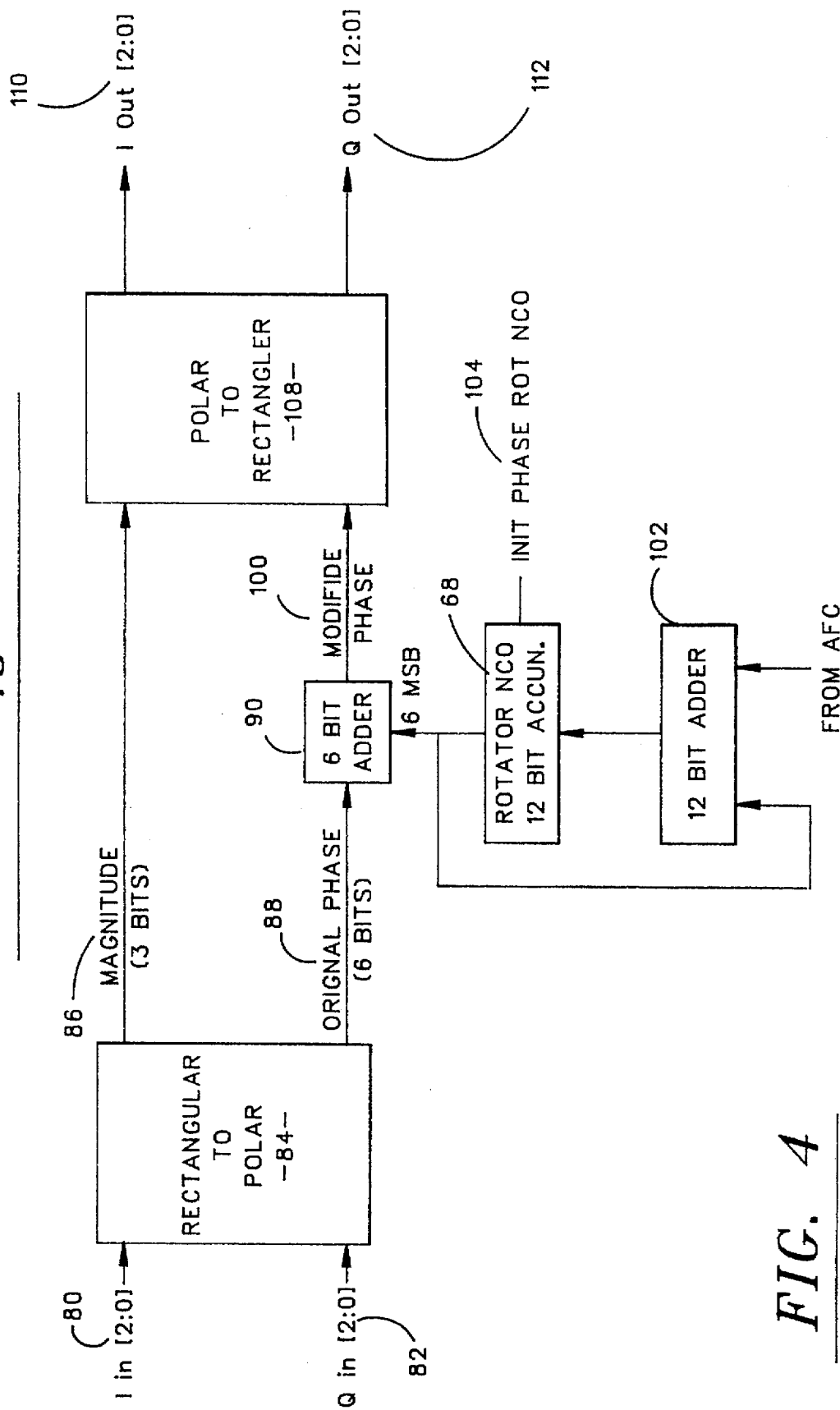
FIG. 4 is a block diagram of a preferred embodiment of the Phase Rotator block shown in FIG. 3.

The digitized RXI 40 and RXQ 42 signals are then multiplied by $(\cos(\phi(t))+j\sin(\phi(t)))$ by the Phase Rotator 48, FIG. 4, where $\phi(t)$ represents the phase value supplied by the Numerically Controlled Oscillator (NCO) 68. If "PhaseRotatorNCO" equals $\phi(t)$, this function may be represented as:

I=I*cos(PhaseRotatorNCO)−Q*sin(PhaseRotatorNCO)
Q=Q*sin(PhaseRotatorNCO)+Q*cos(PhaseRotatorNCO)

The Phase Rotator 48 performs this function by first converting the digitized RXI 40 and RXQ 42 signals from rectangular to polar form by the Rectangular to Polar converter 84 as shown in FIG. 4. In polar form, the I In 80 and Q In 82 signals (corresponding to digitized RXI 40 and RXQ 42, respectively) are represented with three Magnitude bits 86 and six Phase bits 88 which are determined by converting the six input bits into nine output bits as shown in FIG. 5. Small input signals are revectored to a minimum amplitude during the Phase Rotator 48 calculations to reduce quantization noise of the output phase, thus improving performance.

The Original Phase 88 component of the I In 80 and Q In 82 signals is modified by the six MSBs from the NCO Accumulator 68. The Six-Bit Adder 90 adds the Original Phase 88 with the six MSBs of the NCO 68 value and outputs a Modified Phase 100. The Magnitude 86 and Modified Phase 100 bits are then converted back to rectangular form by the Polar to Rectangular converter 108 which maps the bits as shown in FIG. 6. I Out 110 and Q Out 112 are once again four-bit two's complement numbers (−7, −5, −3, −1, 1, 3, 5, 7), with only the three MSBs input to Matched Filters 50, 52 (FIG. 3).

Figure 8:
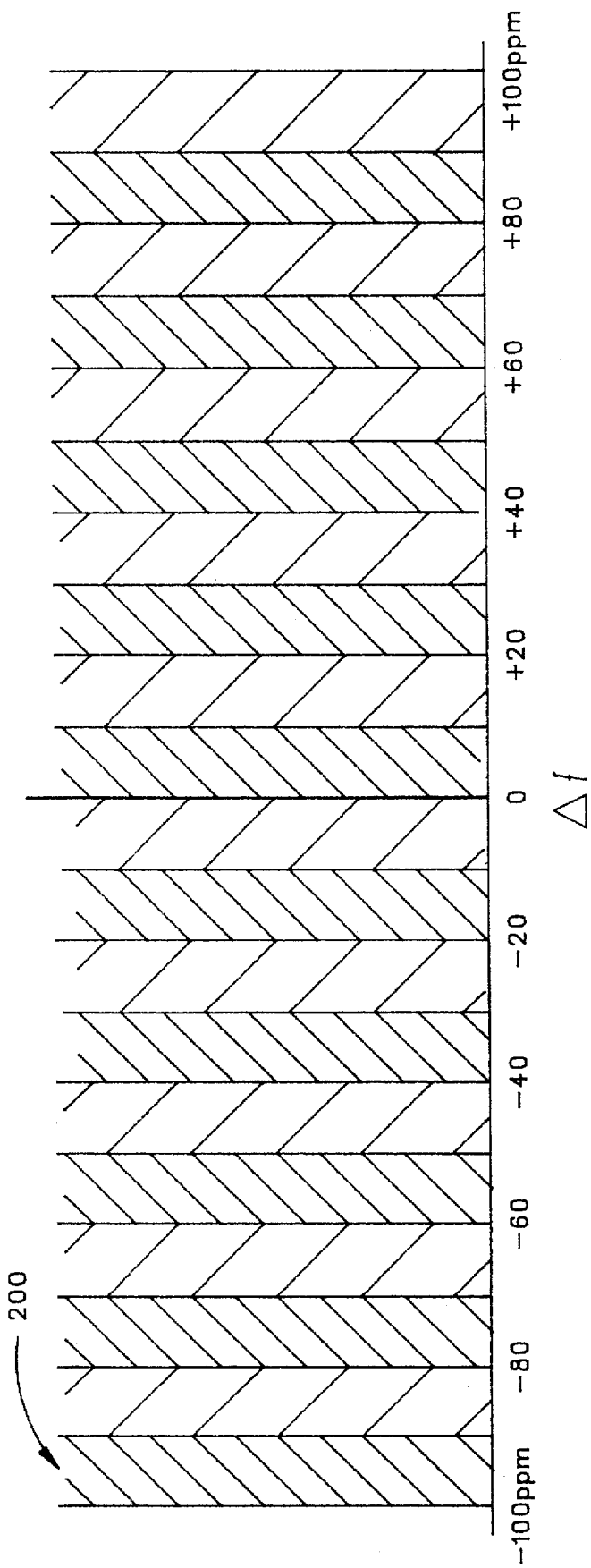
FIG. 8 is a graph showing a preferred frequency division for the frequency bins used by the calibration procedure.
Figure 9:
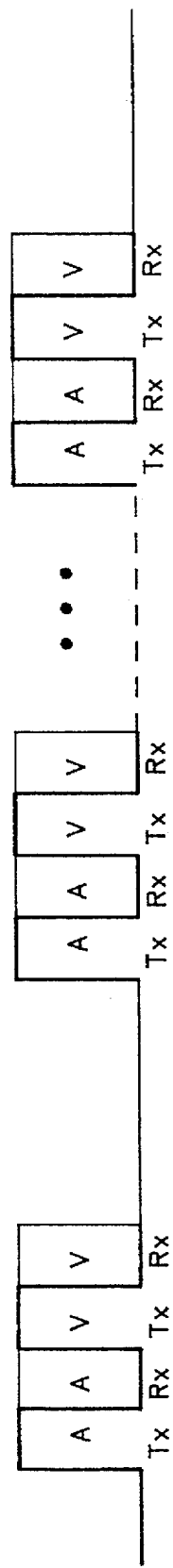
FIG. 9 shows the transmission and reception of A-frames and V-frames for 20 frequency bins.
Figure 11:
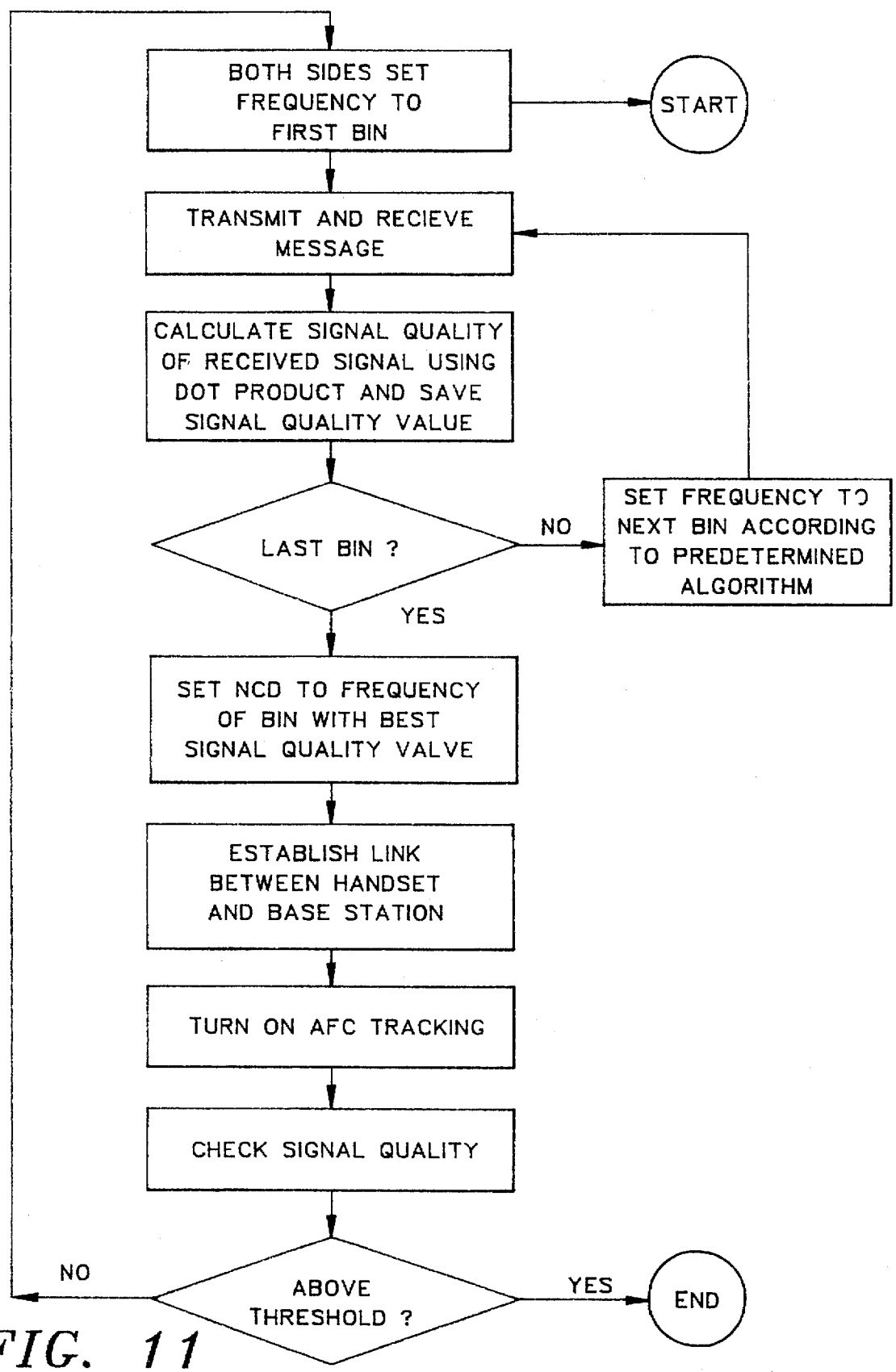
FIG. 11 is a flowchart of the frequency calibration method used when the handset is physically in the cradle of the base station.

The initial value 104 for the Phase Rotator NCO 68 in FIG. 4 is determined by a frequency bin search method performed when the handset is in the base station cradle. As shown in FIG. 8, the allowable frequency error range ±100 ppm is preferably divided into twenty frequency bins. Referring to the flow chart of FIG. 11, when the handset is physically in the base station cradle, each side transmits a brief message with the frequency offset set to a predetermined bin, such as the left most bin 200 shown in FIG. 8. Both the handset and the base station calculate a signal quality for each received signal based on the demodulated dot-product calculation (discussed in detail below). Each side tries all bins according to a predetermined algorithm, such as leftmost bin to rightmost bin or alternatively selecting the least positive, the least negative, the next least positive and the next least negative and so on. Each side stores twenty signal quality values, one for each selected bin. FIG. 9 shows the exchange of A-frames and V-frames for each frequency bin. Once each side has selected the bin with the best signal quality, which normally will be the same bin, both Phase Rotator NCOs 68 are initialized to the value of the bin with the best signal quality. Then a link is established and several frames of data are exchanged between the handset and base station. AFC tracking is turned on to fine-tune the frequency offset. After tracking is initiated, each side once again checks the signal quality and determines if the signal quality is above a certain threshold. If the signal quality is poor, or if a link cannot even be established, the procedure is repeated.

Figure 7:
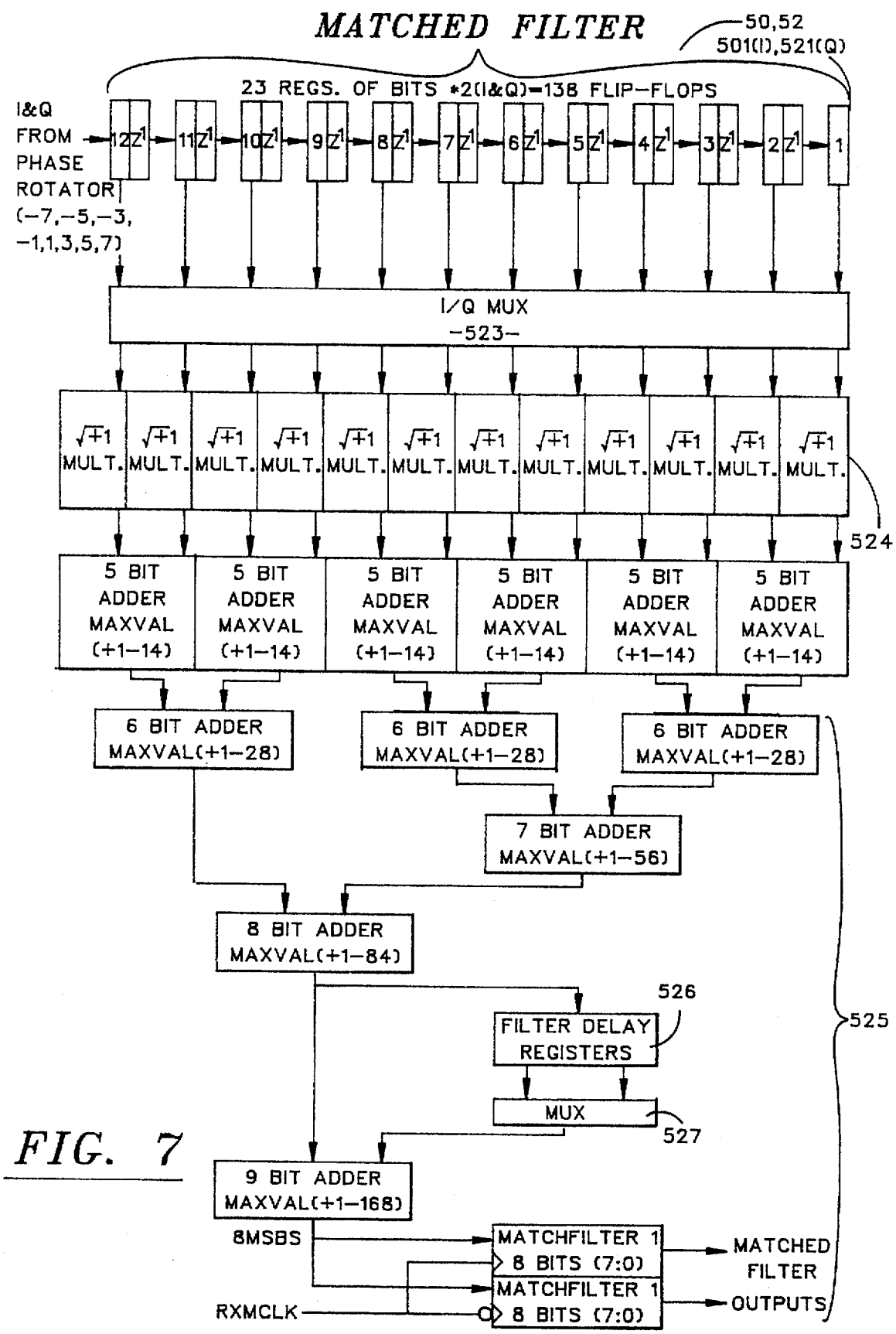
FIG. 7 is a block diagram of a preferred embodiment of the Matched Filter blocks shown in FIG. 3.

The I Out 110 and Q Out 112 data which is output by Phase Rotator 48 is input to Matched Filters 50, 52 (FIG. 3) for removal of the spread spectrum spreading code. FIG. 7 shows a preferred construction for the matched filters 420(I), 420(Q). In operation, the digital data I, Q from the ADCs 362(I), 362(Q) are simultaneously clocked into two, separate 23-long series of 3-bit registers 422(I), 422(Q) at the ADC sampling rate of 1.92 MHz. As already mentioned, 1.92 MHz is 2 times the chip rate of 980 kHz. A total of 24 samples are obtained, therefore, for each bit that was modulated by our 12-chip spreading code-two samples for each chip interval.

The two matched filters 420(I), 420(Q) are preferably implemented, as shown, by time-sharing a coefficient multiplier 424 and a summing network 425. An I/Q MUX 423 is used to alternately provide the I data, and then the Q data, to the coefficient multiplier 424 and the summing network 425. Since the Matched Filters 420(I), 420(Q) are oversampled to 24 samples per bit, the filter's coefficients are also oversampled to 24 (12 chips * 2 samples/chip) with zero insertion between taps.

The filter coefficients are +1 for One Code Bits, and −1 for Zero Code Bits. For example, a 12-chip spreading code of:

111000100010 would result in the following coefficients used for multiplication:

+1, +1, +1, +1, −1, −1, −1, +1, −1, −1, +1, −1

The multiply operation is beneficially simplified by having already limited the digital signals I, Q to 4-bit, 2's complement values of (−7, −5, −3, −1, 1, 3, 5, 7). Multiplying by −1 simply requires an inversion of the 3 MSBs and multiplication by +1 requires no change at all.

The preferred circuit of FIG. 7 further minimizes hardware by summing 24 values in 12-value increments. This 12+12 summing is effected by summing the first 12 values for I & Q, storing these values in filter delay registers 426, and then adding such values to the next 12 values through a summing MUX 427. Note that only 12 of the 23 values held in the shift registers 422(I), 422(Q), or every other one, are passed through the I/Q MUX 423 at any one time, 11 of the other 12 values being temporarily held between the first values that are passed and the 12th value coming in from the Phase Rotator 68.

The maximum output of the matched filters is ±168, values that would occur only if the digital spread spectrum data I, Q from the ADCs was arriving at ±7 and all 24 samples were in perfect code correlation (24*7=168). The peak correlation values from the matched filters will typically be significantly less than the maximum because the ADCs will calibrate under ±7.

After the spread spectrum code has been removed, the data is demodulated by using I and Q matched filter data which is exactly one bit time apart. The Dot Product 58 (FIG. 3) is calculated according to the following equation:

Dot Product=I*I(delayed one bit)+Q*Q(delayed one bit)

The Delay Buffers 54, 56 provide the required I and Q data delayed by one bit time. The multipliers 57(A), 57(B), 57(C), 57(D) in combination with the adders 59(A), 59(B) calculate the Dot Product 58 as shown in FIG. 3. Due to the type of differential encoding used, BPSK, a positive Dot Product value represents a zero (no change in phase) and a negative Dot Product value represents a one (change in phase). The demodulated Dot Product 58 is output as received data RXD 66.

In order to provide improved frequency error compensation, the Cross Product 60 of I and Q is also calculated using the same Delay Buffers 54, 56, multipliers 57(A), 57(B), 57(C), 57(D) and adders 59(A), 59(B) as the Dot Product 58 calculation. The Cross Product 60 provides a close approximation of the existing frequency error as the following equations illustrate. The frequency error $\Delta f = \Delta\phi / \Delta t = \phi(T1) - \phi(T2)/(T1-T2) = \phi$. The cross product of two vectors, D1 and D2 is defined as follows:

$$D1 \times D2 = |D1|*|D2| \sin \phi$$

where $\phi$ equals the angle between vectors D1 and D2. For small angles $\phi$, $\sin\phi = K*\phi$ and since $|D1|*|D2|=1$ for the data bits of the present invention, the cross product is approximately equal to the angle $\phi$. Therefore, the cross product can be used as an approximation of the frequency error between the handset and the base station. In order to implement the cross product calculation, the following formula is used:

Cross Product=$I*Q$(delayed one bit)$-Q*I$(delayed one bit)

Figure 12:
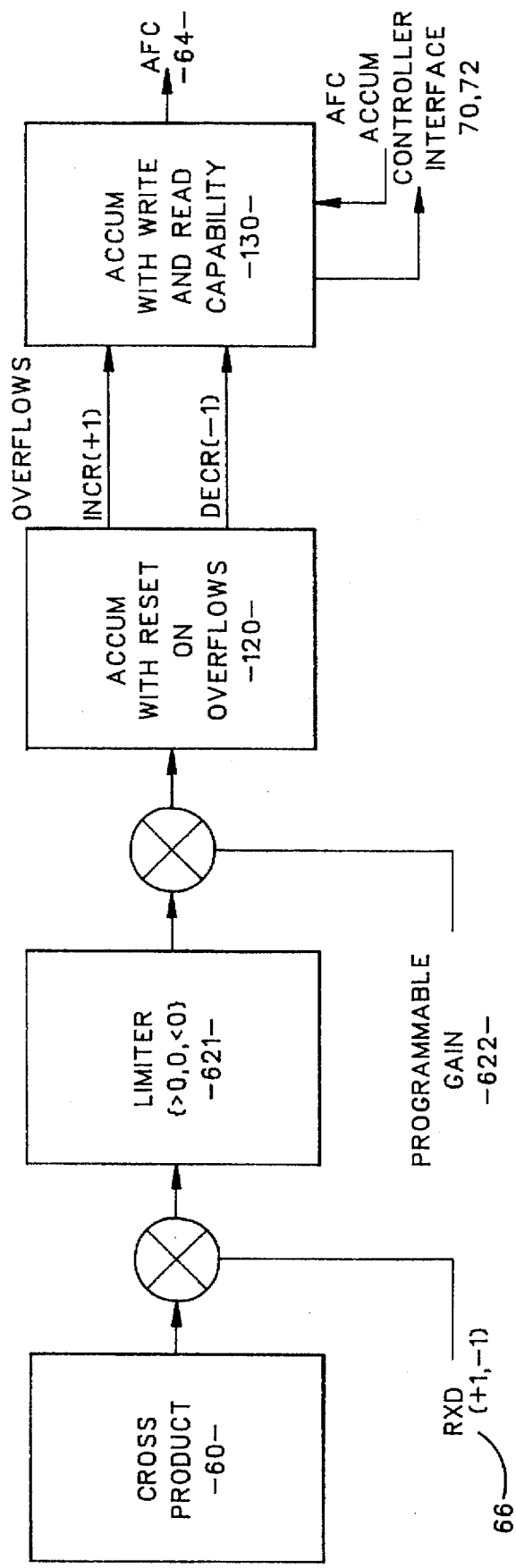
FIG. 12 is a block diagram showing in greater detail the Frequency Error Estimate block of FIG. 3.
Figure 13:
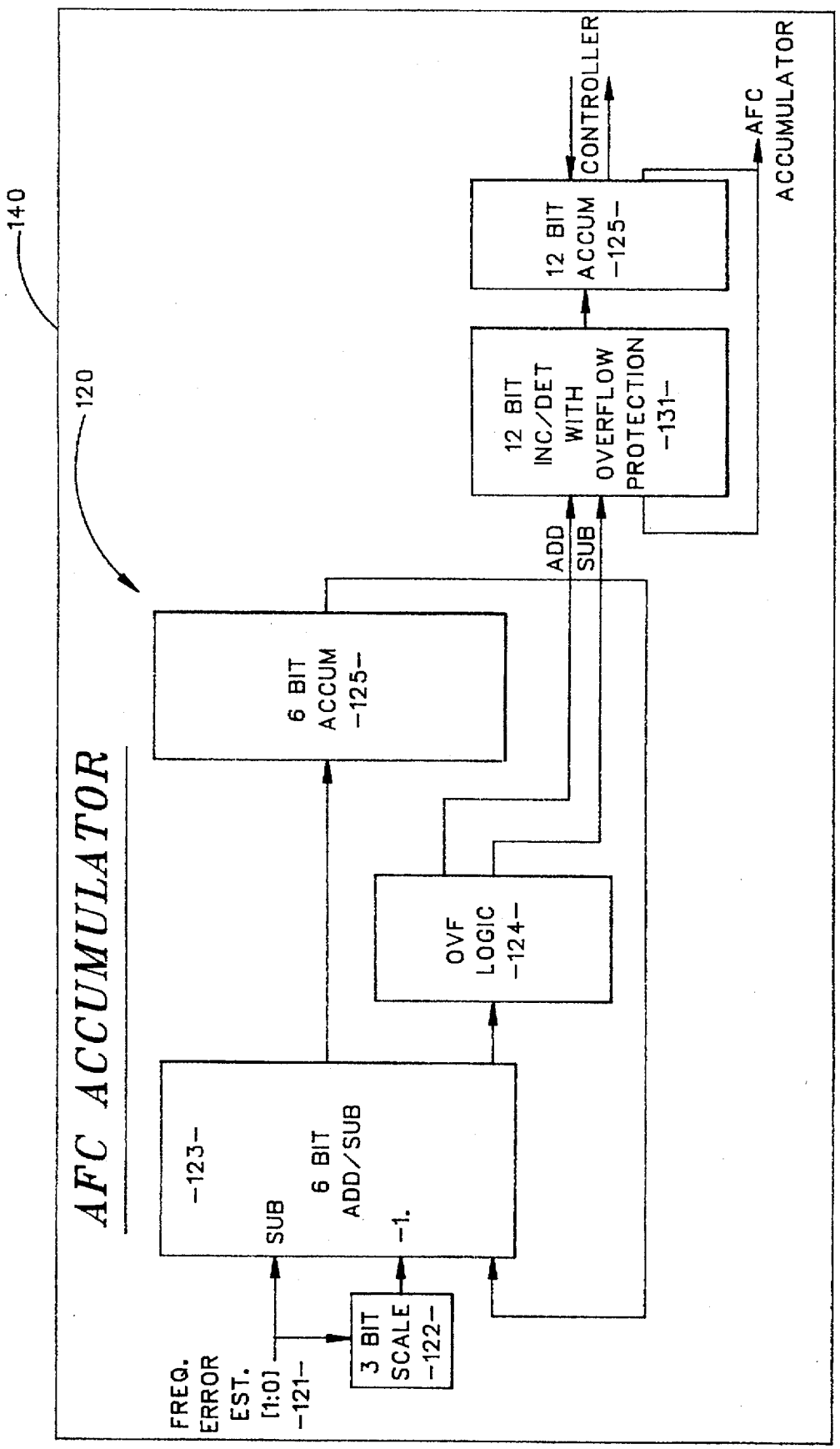
FIG. 13 is a block diagram showing the preferred embodiment of the Accumulator blocks shown in FIG. 12.
Figure 14:
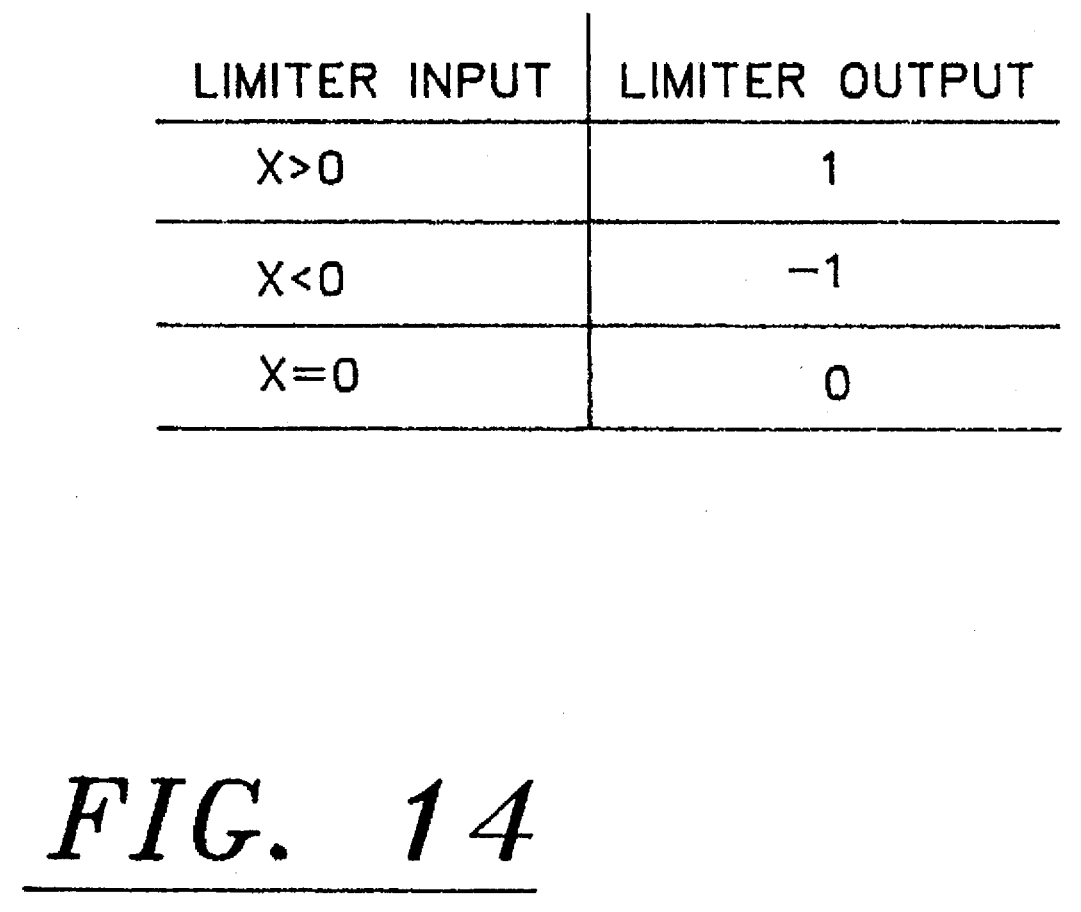

As shown in FIG. 12, the resultant Cross Product 60 is scaled by the received data RXD 66 which is either +1 or −1 to ensure that the angle represented by the cross product is not distorted by data. The Limiter 621 limits the cross product values to either −1.0 or +1 depending on the input values as shown in FIG. 14. The limited values are scaled by a constant set by a programmable gain 622. The limited and scaled Cross Product (FreqErrorEst 121) is input to the AFC Accumulator 140, which functions as a simple digital "random walk" filter. The random walk digital filter smoothes errors in the frequency estimation. The 3-bit scale 122 is user programmable and may be set to control the tracking speed. The 6-bit add/sub 123, adds the value of the 6-Bit Accumulator 125 with FreqErrorEst 121, as scaled by the 3-bit scale 122. When the 6-bit add/sub 123 overflows, the 12-Bit Inc/Dec 131 is incremented if the overflow is positive, or decremented if the overflow is negative, as determined by the overflow logic 124.

Once the overflow threshold is reached, the AFC value will be updated. The incremented or decremented value is then stored in the 12-Bit Accumulator 132 and the 6-Bit Accumulator 125 is reset. By adjusting the size of the 6-Bit Accumulator 125, the reset threshold may be modified to change the rate at which the AFC value 64 changes. The new 12 Bit Accumulator value is provided to Phase Rotator NCO 68 and the system microcontroller via the controller interface lines 70, 72, thus updating the frequency error compensation. This is a very robust frequency compensation method for slowly varying frequency changes.

Those skilled in the art will appreciate that various adaptations and modifications may be made to the disclosed embodiment without departing from the scope and spirit of the invention. Therefore, it is to be understood that, within the scope of the appended claims, the invention may be practiced other than as specifically described herein.

What is claimed is:

1. In a direct sequence spread spectrum communications system, a frequency error estimation and compensation circuit to correct frequency error in received in-phase (I) and quadrature (Q) signals comprising:

matched filter means for removing a spreading code from the received I and Q signals;

phase rotator means for multiplying the received I and Q signals by $(\cos\phi(t)+j\sin\phi(t))$ before providing the received I and Q signals to the matched filter means, wherein $\phi(t)$ is a phase value representing the estimated frequency error in the received I and Q signals and wherein an initial phase value $\phi(t)$ for the phase rotator means is determined by a frequency calibration bin search;

cross product determining means for calculating a cross product of the received I and Q signals, the cross product an estimate of the frequency error in the received I and Q signals; and filtering means for filtering and limiting the cross product, and determining a phase error value based on the filtered and limited cross product, the phase error value being used to modify the phase value $\phi(t)$;

wherein the phase rotator means adjusts the phase of the received I and Q signals based on an updated phase value $\phi(t)$ determined by adding a previous value $\phi(t)$ with the phase error value determined by the filtering means.

2. The frequency error estimation and compensation circuit of claim 1 wherein the phase rotator means comprises:

rectangular to polar conversion means for converting the received I and Q signals from rectangular form to polar form, wherein the polar form of the I and Q signals comprise a Magnitude component and a Phase component;

phase rotator accumulator means for storing the phase value $\phi(t)$;

first adder means for adding the phase value $\phi(t)$ stored in the phase rotator accumulator means with the Phase component of the received I and Q signals and outputting a Modified Phase component;

second adder means for adding the phase value $\phi(t)$ stored in the phase rotator accumulator means with the phase error value determined by the filtering means, wherein the output of the second adder means is then stored in the phase rotator accumulator means; and polar to rectangular conversion means for converting the Magnitude component and the Modified Phase component to rectangular form.

3. The frequency error estimation and compensation circuit of claim 2 wherein the cross product determining means comprises:

delay means for delaying a current I and current Q signal by one bit time;

multiplying means for multiplying a current I signal value by a Q signal value delayed one bit time by the delay means, and outputting a first value, and for multiplying a current Q signal value by an I signal value delayed one bit time by the delay means, and outputting a second value;

subtractor means for subtracting the second value from the first value and outputting the cross product.

4. The frequency error estimation and compensation circuit of claim 3 wherein the filtering means comprises:

multiplier means for multiplying the cross product by a dot product demodulated received data value and outputting a scaled cross product; and limiter means for limiting the scaled cross product value to one of −1.0 and +1, wherein the cross product is limited to −1 if the cross product calculated by the cross product determining means is less than 0, the cross product is limited to 0 is the cross product calculated by the cross product determining means equals 0, and the cross product is limited to +1 is the cross product calculated by the cross product determining means is greater than 0.

5. The frequency error estimation and compensation circuit of claim 4 wherein the filtering means further comprises:

n bit accumulator means for storing a n bit value;

m bit scale value storage means for storing a m bit programmable value;

n bit adder means for adding the value stored in the n bit accumulator means with the m bit value stored in the m bit scale value storage means, wherein when the adder means has an overflow, the phase error value is incremented when the overflow is positive and the phase error value is decremented when the overflow is negative, and wherein the n bit accumulator is reset to 0 when an overflow occurs.

6. The frequency error estimation and compensation circuit of claim 5 wherein n equals 6 and m equals 3.

7. In a digital cordless telephone system using direct sequence spread spectrum modulation having a handset and a base station, an automatic frequency control tracking circuit in both the handset and base station comprising:

analog to digital converter means for converting analog received in-phase (I) and quadrature (Q) signals into digital signals;

phase rotator means for multiplying the digital I and Q signals from the analog to digital converter means by $(\cos\phi(t)+j\sin\phi(t))$, wherein $\phi(t)$ is a phase value representing the estimated frequency error in the received I and Q signals, the phase rotator means comprising:

rectangular to polar conversion means for converting the received I and Q signals from rectangular form to polar form, wherein the polar form of the I and Q signals comprise a Magnitude component and a Phase component;

phase rotator accumulator means for storing the phase value $\phi(t)$;

first adder means for adding the phase value $\phi(t)$ stored in the phase rotator accumulator means with the Phase component of the received I and Q signals and outputting a Modified Phase component;

second adder means for adding the phase value $\phi(t)$ stored in the phase rotator accumulator means with a phase error value determined by a filtering means, wherein the output of the second adder means is then stored in the phase rotator accumulator means; and polar to rectangular conversion means for converting the Magnitude component and the Modified Phase component to rectangular form;

matched filter means for removing a spread spectrum code sequence form the received I and Q signals;

cross product determining means for calculating a cross product of the received I and Q signals, the cross product being an estimate of the frequency error in the received I and Q signals, the cross product determining means comprising:

delay buffer means for delaying a current I and current Q signal by one bit time;

multiplying means for multiplying a current I signal value by a Q signal value delayed one bit time by the delay buffer means, and outputting a first value, and for multiplying a current Q signal value by an I signal value delayed one bit time by the delay buffer means, and outputting a second value;

subtractor means for subtracting the second value from the first value and outputting the cross product; and filtering means for filtering and limiting the cross product, and determining a phase error value based on the filtered and limited cross product, the phase error value being used to modify the phase value $\phi(t)$;

multiplier means for multiplying the cross product by a dot product demodulated received data value and outputting a scaled cross product;

limiter means for limiting the scaled cross product value to one of −1, 0 and +1, wherein the cross product is limited to −1 if the cross product calculated by the cross product determining means is less than 0, the cross product is limited to 0 is the cross product calculated by the cross product determining means equals 0, and the cross product is limited to +1 is the cross product calculated by the cross product determining means is greater than 0;

n bit accumulator means for storing a n bit value;

m bit scale value storage means for storing a m bit programmable value;

n bit adder means for adding the value stored in the n bit accumulator means with the m bit value stored in the m bit scale value storage means, wherein when the adder means has an overflow, the phase error value is incremented when the overflow is positive and the phase error value is decremented when the overflow is negative, and wherein the n bit accumulator is reset to 0 on an overflow;

wherein the phase rotator means adjusts the phase of the received I and Q signals from the analog to digital converter means using an updated phase value $\phi(t)$ determined by the output of the second adder means.

8. The automatic frequency control tracking circuit of claim 7 wherein the n bit accumulator is a 6 bit accumulator.

9. The automatic frequency control tracking circuit of claim 7 wherein the phase rotator accumulator means stores an initial phase value $\phi(t)$ determined by a frequency bin search performed during a system frequency error calibration.

10. The automatic frequency control tracking circuit of claim 7 wherein the filtering means further comprises a programmable gain control means to scale the limited cross product.

* * * * *